E. K. ROOT.
Revolver.
No. 846. Reissued Nov. 1, 1859.
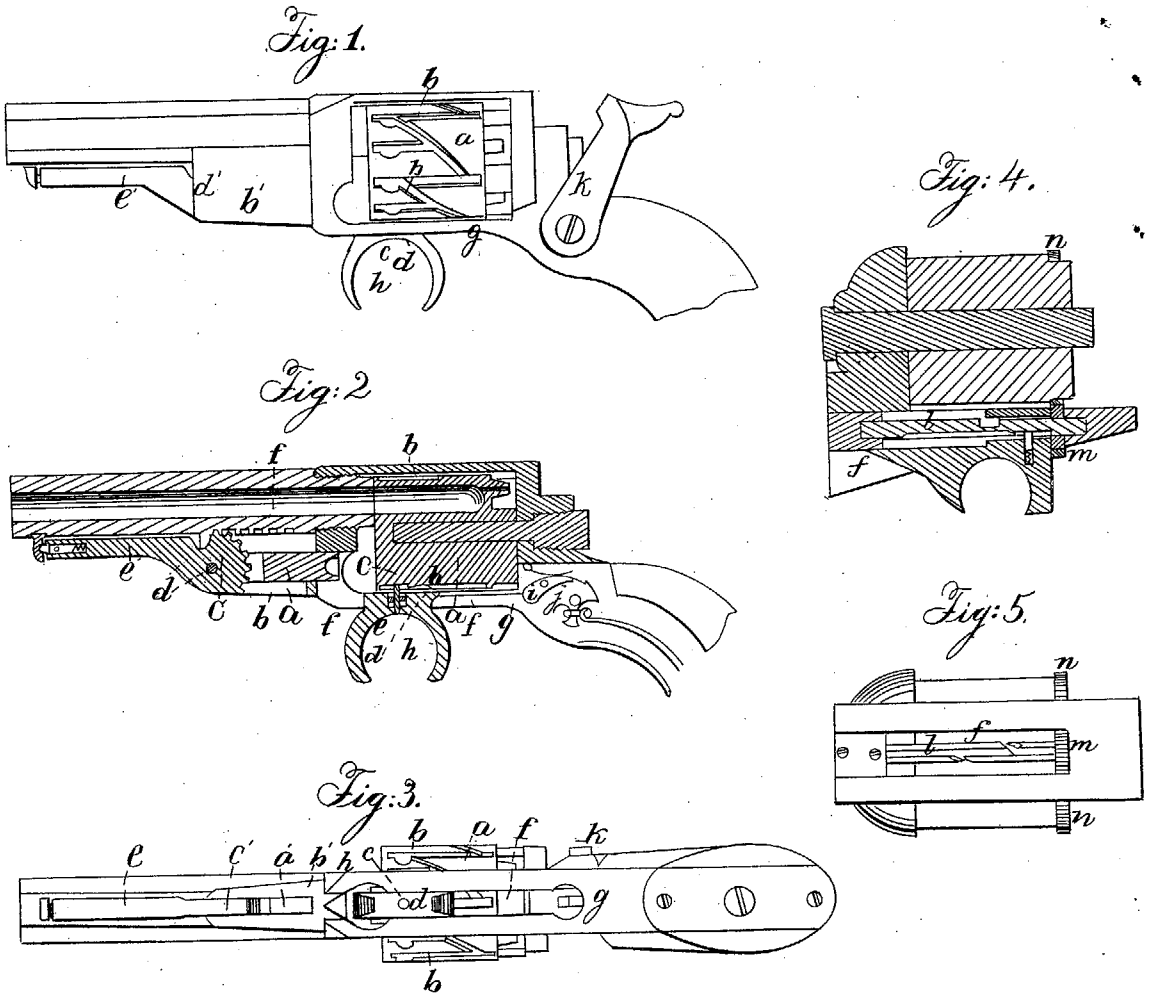
Witnesses.
R D Hulbard
Benning Muir
E K Root
N. PETERS, PHOTO-LITHOGRAPHER, WASHINGTON, D. C.

UNITED STATES PATENT OFFICE.

E. K. ROOT, OF HARTFORD, CONNECTICUT.

IMPROVEMENT IN REVOLVING FIRE-ARMS.

Specification forming part of Letters Patent No. 13,999, dated December 25, 1855; Reissue No. 846, dated November 1, 1859.

*To all whom it may concern:*

Be it known that I, E. K. ROOT, of Hartford, in the State of Connecticut, have made a certain new and useful Improvement in Many-Chambered Rotating-Breech Fire-Arms; and I do hereby declare that the following is a full, clear, and exact description thereof, reference being had to the accompanying drawings, making part of the specification, in which—

Figure 1 is a side elevation; Fig. 2, a longitudinal vertical section, and Fig. 3 a bottom view.

The same letters indicate like parts in all the figures.

My said invention relates to an improvement on that class of rotating-breech fire-arms in which the breech is rotated to bring the several chambers in succession to the line of the barrel, a driving-pin attached to a slide and working in longitudinal and diagonal grooves cut in the periphery of the rotating breech.

In this class of arms as heretofore made the driving-pin has been connected with and operated by the hammer or cock, or some part of the lock connected and moving with the cock or hammer, so that if the driving-pin meets with any obstruction in the longitudinal grooves in the act of firing, the momentum of the hammer will be so far checked as not to have force enough to explode the cap.

The object of my improvement is to avoid this difficulty; and to this end my said invention consists in combining the driving-pin that works in the grooves to rotate and hold the breech with a slide below having a loop or equivalent for the reception of the trigger-finger, by which it is moved back and forth and adapted to act on the lock at the end of its back motion to liberate the hammer and fire the load; and my said invention also consists in combining a plunger or ramrod with a many-chambered rotating-breech pistol or other fire-arm by means of a lever provided with a cogged sector engaging a cogged rack, so that in the limited compass of such arms the plunger, adapted to slide in suitable ways to move in the line of the bore of the chambers, may receive the required range of motion for ramming the charges into the chambers as in succession they are brought in line with the said plunger.

In the accompanying drawings, *a* represents the many-chambered rotating breech with the well-known arrangement of longitudinal and diagonal grooves *b*, in which the driving-pin *c* works to rotate the breech to bring the chambers successively in line with the barrel, and to hold each chamber in line during the discharge. This pin is fitted to a sliding block, *d*, and provided in the usual manner with a spring, *e*, to force it against the bottom of the grooves and adapt itself to their varying depth in manner well known, and the sliding block is adapted to slide freely but accurately in a slot, *f*, in the bottom plate, *g*, below the rotating breech and parallel therewith; and below this plate the block is formed into a loop or eye, *h*, of suitable shape to receive the trigger-finger, by which the block with its driving-pin can be pushed forward and drawn back the required distance for rotating the breech. After the sliding block has been drawn back sufficiently far to pass out of one of the diagonal grooves, to turn the breech the required distance to bring the next chamber in line with the barrel, and to enter one of the longitudinal grooves to hold the chamber in line, its rear end then strikes against the end of the spring-catch *i*, which holds the tumbler *j* of the cock or hammer *k* and liberates it, that the cock or hammer may be forced onto the cap with the full force of the mainspring. In this way the driving-pin cannot present any impediment to the motion of the cock or hammer.

The arm can be operated with great rapidity by pushing forward the slide of the driving-pin with the trigger-finger while the hammer is brought to the full-cock with the thumb; and then by pulling back the slide with the trigger-finger the breech is rotated, held in place, and the hammer liberated by the one motion.

Instead of making the grooves on the periphery of the rotating breech, they may be made on the periphery of a small cylinder, *l*, mounted on journals in the slot *f*, as represented in Figs. 4 and 5, placed below and parallel with the rotating breech, and geared therewith by a pinion, *m*, on the end of the cylinder and corresponding cogs, *n*, on the periphery of the breech. When thus modified the number of grooves in the periphery of the cylinder *l* should be proportioned to the difference between the diameters of the range of cogs on the breech and the pinion on the cylinder.

There is a plunger or ramrod, *a*, fitted to slide freely but accurately in a tube, *b*, below and parallel with the bore of the barrel and in line with the chambers of the rotating breech as they are brought around in succession. The outer end of the plunger is slotted and embraces a cogged sector, *b'*, with which it is connected by a hinge pin, *d'*. This sector is on one end of a lever, *e*, by which it is operated, and the cogs on its periphery engage the cogs of a straight rack, *f*, along the under side of the barrel, or, if preferred, the metal frame to which the barrel is attached. The outer end of the lever *e'* should be provided with a spring catch or latch, by which it may be secured along the under side of the barrel with the plunger drawn out when not in use.

The tube *b* is slotted for a sufficient distance from the outer end to permit the sector to work therein freely.

From the foregoing it will be seen that while the plunger is adapted move truly in the line of the box of each chamber when brought in line to insure the proper ramming of the charges, at the same time the required range of motion can be given to it within the limited compass presented by such arms, as by the working of the cogged sector in the cogs of the straight rack each cog in succession becomes the fulcrum on which the lever turns.

What I claim as my invention, and desire to secure by Letters Patent, is—

1. Combining the driving-pin that works in the grooves to rotate and hold the breech in line with a slide below adapted to the reception of and to be operated by the trigger-finger, and acting on the lock at the end of the back motion to liberate the cock or hammer, discharge the load, substantially as described.

2. Combining the plunger with the many-chambered rotating-breech pistol or other fire-arm by means of a lever with a cogged sector engaging the cogs of a straight rack, substantially as and for the purpose specified.

E K. ROOT.

Witnesses:
RICHD. D. HUBBARD,
BENNING MUNN.